Sept. 20, 1938.   H. G. GRELLE   2,130,543
AUTOMATIC FISHING LEADER
Filed Jan. 24, 1938
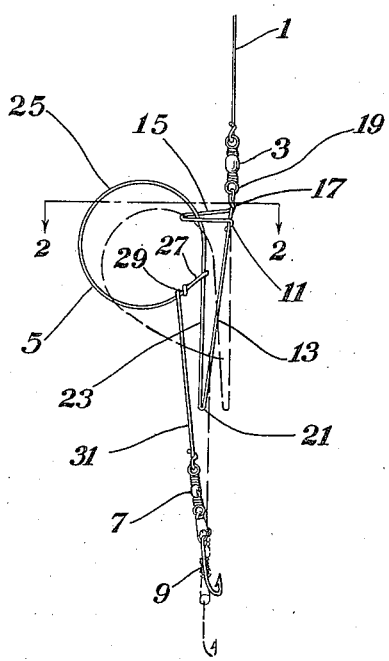
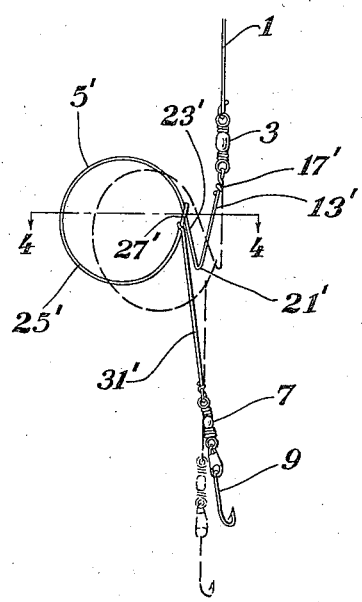
Fig. 3
Fig. 1
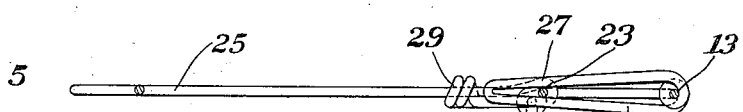
Fig. 2
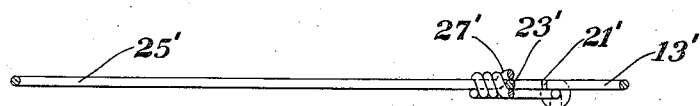
Fig. 4
Inventor
Henry George Grelle
By
Attorney Patented Sept. 20, 1938

2,130,543

UNITED STATES PATENT OFFICE 2,130,543

AUTOMATIC FISHING LEADER

Henry George Grelle, New Orleans, La.

Application January 24, 1938, Serial No. 186,703

6 Claims. (Cl. 43—34)

This application is a continuation-in-part of application Serial No. 145,029, filed May 27, 1937.

The instant invention is directed to the forming of an automatic fishing leader, that is, a fishing leader which is adapted to give an automatic hooking action to a fishing line as soon as the hook is grasped by a fish.

It is an object of the invention to provide a fishing leader which is automatic in function.

Another object of the invention is to make an automatic fishing leader of a single length of wire, preferably of a stainless steel wire.

A further object of the invention is to make an automatic fishing leader which is light in weight, simple in construction, and which is always in operable position.

The invention has for a further object the provision of a fishing leader which is formed from a single length of wire bent so as to form a resilient coil and a stop portion to which the fish hook is attached.

Yet another object of the invention is to make a fishing leader having a resilient loop arranged so that when a fish strikes the hook the tension on the resilient loop takes the place of the jerk normally given the line by the fisherman.

Generally the objects of the instant invention are accomplished by bending a single length of wire back upon itself to form a stop portion and then bending the wire into a large resilient loop portion, the wire then being bent around said rebent portion so that the bent portion can be pulled against the resiliency of the loop until it strikes the stop portion. The hook is fastened to the free end of the wire extending from the loop portion and the fishing line is fastened to the other end of the leader thus formed.

The means by which the objects of the invention are obtained as set forth above may be more readily understood by making reference to the accompanying drawing, in which:

Fig. 1 is a front view of one form of my invention;

Fig. 2 is a view taken along the line 2—2 of Fig. 1;

Fig. 3 is a front view of a modified form of my invention; and

Fig. 4 is a view on the line 4—4 of Fig. 3.

Similar reference characters denote similar parts throughout the various figures.

In Fig. 1, a fishing line is shown at 1, which fishing line is secured to a swivel 3 in a customary manner. Attached to the other end of the swivel is an automatic fishing leader which is denoted generally at 5, which will be described later. The other end of the automatic fishing leader is secured to a swivel 7 which has a fishing hook 9 attached thereto.

The automatic leader which has been generally designated as 5 is, as stated above, preferably made of a single length of wire. This wire is made of spring steel, preferably stainless steel, although any other resilient metal may be employed. Of course, any gauge wire may be used, all depending upon the type of fishing in which the fisherman is to indulge.

As shown in Fig. 1, one end of the wire is attached to the swivel 3 by means of an eye 19. The very end of the wire is shown at 11, which wire is twisted around an extending portion of the wire 13. From the end 11 the wire is formed into a V-shaped portion 15, and then again twisted around the portion 13 at 17, and then continued into the eye 19 which forms the element for the connection of the automatic leader to the swivel 3. From the eye 19 the wire is extended into the straight portion 13, previously mentioned, and rebent at 21 to form a rearwardly or upwardly extending portion 23 which is continued into the resilient loop 25. Portions 13 and 23 form a V-shaped section constituting one of the stopping members of the device. The end of resilient loop 25 is bent into the form of an eye 27 through which is threaded the rearwardly extending portion 23. The eye is closed by twisting the wire around the loop portion 29 and then the wire is extended out into a straight portion 31 which is attached to the swivel 7.

As shown by the dot and dash lines in Fig. 1, the device operates as follows: When a fish has seized baited hook 9, and starts away, the member 31 is pulled, thus sliding the eye 27 along the member 23 against the resiliency of the loop. When the eye 27 has reached the position shown in dotted lines, it is to be noted that the resilient loop 25 is pressed against the base of the V-shaped portion 15, thus increasing the tension in the loop against which the fish is pulling. Further pull upon the wire brings the eye 27 against the stop 21 with a sudden jerk, and brings the tension in the wire loop to its maximum, thereupon the wire loop 25 will tend to spring back into its original untensioned position and will cause the hook 9 to jerk toward the fishing line, thus fastening the hook into the mouth of the fish. Consequently, the leader automatically performs the function usually performed by hand, that is to say, when the fishing line is seen to move because of a fish having seized the bait, the fisherman usually jerks the line to fasten the hook into the fish.

This same operation is performed automatically by the fishing leader disclosed in Figs. 1 and 2. As soon as the fish has been taken from the hook the leader returns to its original position and is ready for further use.

A simplified form of my invention is shown in Fig. 3. In this figure the numeral 1 again indicates a fishing line. A swivel 3 is disposed between the fishing line and the automatic leader 5'. A second swivel 7 has the fishing hook 9 secured thereto. Again the automatic leader is formed of a spring wire and has one end attached to the swivel 3 by means of an eye 17'. The wire is continued from the eye into the straight portion 13' which terminates in a rebent stop portion 21', and from a straight rearwardly extending portion 23' is continued into the resilient loop 25'. Portions 13' and 23' form a V-shaped member similar to that shown in Fig. 1. The end of the loop is slidably secured by means of an eye 27', through which the loop and the straight portion 23' are threaded.

From the eye 27' the wire is continued into another straight portion 31' which terminates by being fastened to the swivel 7.

The operation of this modified form of my invention is generally similar to the operation of the structure shown in Figs. 1 and 2, that is, the hook 9 is pulled against the resiliency of the resilient loop member 25', the eye 27' sliding along the member 23' until it reaches the stop at the V-bend 21'. This eye member is brought to a halt suddenly which causes a jerk upon the hook 9, thus fastening the hook into the mouth of a fish. The tension in the spring 25' insures that the hook is securely fastened into the mouth of the fish.

It is apparent that the invention provides a great advantage for fishing inasmuch as the same automatically takes care of the feel of the line, or may take the place of, or supplement the bobbin which is sometimes used. The invention provides an easy and automatic way in which to insure that the fish, once they have struck the bait, will automatically fasten themselves to the hook, and thus will be caught by the fisherman.

Having now described a means by which the objects of this invention are obtained, what I claim is:

I claim:

1. An automatic fishing leader adapted to connect a fishing line with a fish hook comprising a V-shaped member having the end of the first leg adapted to be secured to said line and having the end of the second leg continued to form a resilient loop, means for slidably attaching one end of said loop to said second leg, and means for securing said loop to said hook whereby the base of said V-shaped member acts as a stop for said securing means when said hook is pulled against said line.

2. An automatic fishing leader adapted to connect a fishing line with a fish hook comprising a single length of spring wire formed into a V-shaped member and having the end of a first leg adapted to be secured to said line and having the end of a second leg continued into a resilient loop, said loop being continued into an eye slidably mounted on said second leg, and the wire in said eye being continued in a straight length of wire, and means on the end of said straight length adapted to be secured to said fish hook.

3. An automatic fishing leader comprising a V-shaped stop portion, a resilient loop portion, and a hook securing portion, one end of said V-shaped portion being secured to said loop portion, and said hook securing portion being secured to said loop portion by means slidable upon said V-shaped portion.

4. An automatic fishing leader as in claim 3, a second V-shaped stop member depending from said first V-shaped portion, said loop being passed through said second V-shaped member.

5. An automatic fishing leader comprising an expansible resilient loop member, means for securing a fishing hook to said loop, means for limiting the expansion of said loop in a first direction upon a pull on said hook securing means, and means for limiting the expansion of said loop in a second direction substantially perpendicular to said first direction.

6. An automatic fishing leader as in claim 5, said first limiting means including a V-shaped stop for limiting the expansion of said loop in said first direction before said second limiting means limits the expansion in said second direction.

HENRY GEORGE GRELLE.